United States Patent [19]

Bugash et al.

[11] 4,365,617

[45] Dec. 28, 1982

[54] SOLAR ENERGY HEATING SYSTEM

[76] Inventors: Eckhard Bugash, 2493 Montclair Ave.; George Kubina, 3262 Armstrong Rd., R.D. No. 2, both of Wooster, Ohio 44691

[21] Appl. No.: 193,135

[22] Filed: Oct. 2, 1980

[51] Int. Cl.³ .............................................. F24J 3/02
[52] U.S. Cl. .................................. 126/425; 126/436; 126/438
[58] Field of Search ............... 126/424, 425, 438, 439, 126/430, 436, 429, 418, 435; 60/640, 641; 250/203 R

[56] References Cited

U.S. PATENT DOCUMENTS

| | | | |
|---|---|---|---|
| 3,993,041 | 11/1976 | Diggs | 126/435 |
| 4,081,024 | 3/1978 | Rush et al. | 126/436 |
| 4,132,223 | 1/1979 | Reddall | 126/425 |
| 4,137,898 | 2/1979 | Koizumi et al. | 126/436 |
| 4,153,039 | 5/1979 | Carroll | 126/424 |
| 4,249,512 | 2/1981 | Rivetti et al. | 126/429 |
| 4,256,088 | 3/1981 | Vindum | 126/418 |
| 4,269,168 | 5/1981 | Johnson | 126/438 |
| 4,291,678 | 9/1981 | Strickland | 126/438 |
| 4,297,572 | 10/1981 | Carlton | 126/425 |

FOREIGN PATENT DOCUMENTS 517754 7/1976 U.S.S.R. .............................. 126/451

*Primary Examiner*—James C. Yeung
*Attorney, Agent, or Firm*—John E. Benoit

[57] ABSTRACT

The invention basically includes a movable base which contains a plurality of hyperbolic mirror reflectors having their axis directed upwardly towards an absorber plate and which is directed upon an energy converting unit. The solar energy is absorbed by the unit and is used to heat a gas such as air which is circulated through the unit, with the heat being subsequently stored in a heat absorbing particulate material such as lava rock or the like. Additionally, the movable platform is controlled by a gravity drive (for very low power consumption during operation) and which is in turn controlled by a photoelectric solar detector mechanism. The detector mechanism is so designed that it receives the early rays of light of the sun and signals the control system to commence tracking the sun. This operation continues until the sun sets, at which time a signal is sent to the control system to return the platform to its original position in the east whereby it is available for commencing the tracking of the sun the following day. The heat stored within the rock is transferred to a water system which includes pipes so that the heated water may be used to furnish the necessary heat to the particular structure being serviced.

9 Claims, 16 Drawing Figures

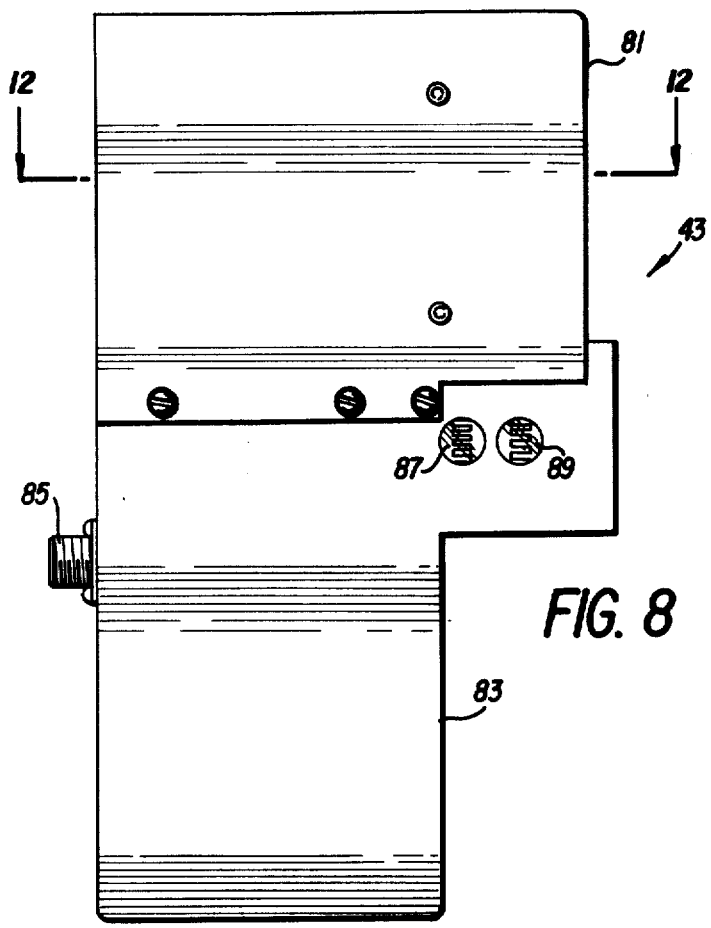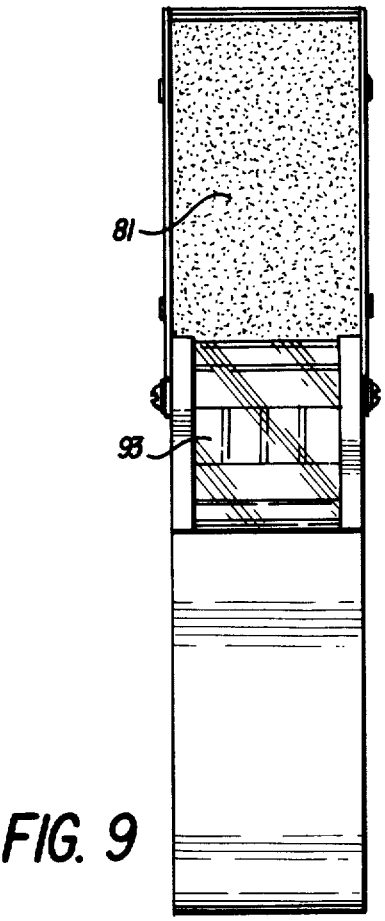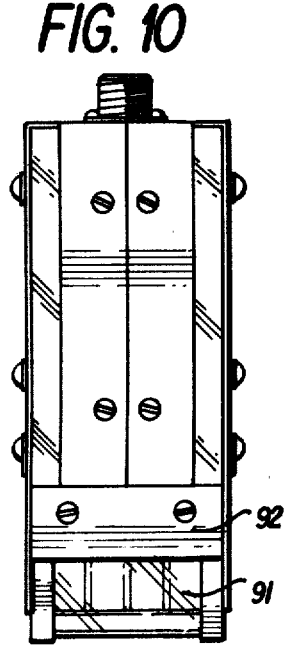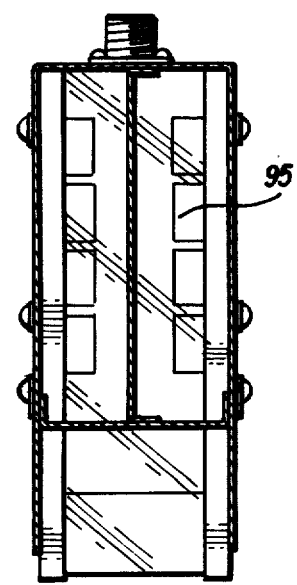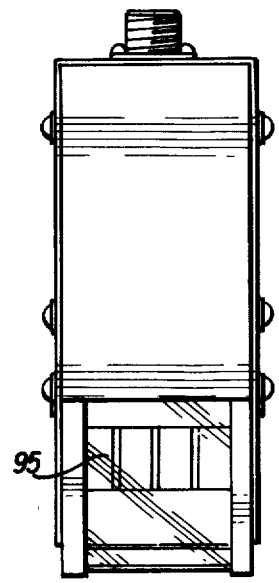
FIG. 8
FIG. 9
FIG. 10
FIG. 12
FIG. 11

SOLAR ENERGY HEATING SYSTEM

This invention relates generally to systems utilizing solar energy for heating purposes and more specifically to tracking devices relating to solar energy collectors and the storage of the energy in the form of heat associated therewith.

In view of the energy crisis which exists throughout the world at the present time, many proposals have been made relating to sources of energy other than fossil fuels. One of the prime sources is nuclear energy which is a specific field in itself. The other primary source being considered at this time is the use of solar energy where applicable for various energy purposes. Solar energy, at the present time, has certain practical and cost limitations relative to the production of electricity therefrom. However, many existing systems do use solar energy as a supplement for various heating systems both domestically and commercially. One of the problems relating to these types of systems is the size and the cost of installing such a system in comparison to the relative inefficiency which is provided in the conversion of solar energy into heat.

Accordingly, it is an object of this invention to provide a solar energy collector with accompanying control systems which may be reasonably added to existing structures in order to replace their heating system.

It is a further object of this invention to provide a system for collecting solar energy which includes means for automatically tracking the sun so as to maximize the efficience of the collecting system.

It is a further object of this invention to provide a system for converting solar energy into heat through the use of a compact, relatively inexpensive system including a constant tracking mechanism.

A still further object of this invention is to store the solar heat in a relatively large storage area containing heat retaining material, such as lava rock.

These and other objects of the invention will become apparent from the following description when taken in conjunction with the drawings.

BRIEF DESCRIPTION OF THE DRAWINGS

FIG. 8 is a side elevational view of the detector-controller which may be used in the present invention;

FIG. 9 is a front view of the controller of FIG. 8;

FIG. 10 is a top view of the controller of FIG. 8;

FIG. 11 is a bottom view of the controller of FIG. 8;

FIG. 12 is a sectional view through the lines 12—12 of FIG. 8;

BRIEF SUMMARY OF THE INVENTION

The invention basically includes a movable base which contains a plurality of hyperbolic mirror reflectors having their axis directed upwardly towards an absorber plate and which is directed upon an energy converting unit. The solar energy is absorbed by the unit and is used to heat a gas such as air which is circulated through the unit, with the heat being subsequently stored in a heat absorbing particulate material such as lava rock or the like. Additionally, the movable platform is controlled by a gravity drive (for very low power consumption during operation) and which is in turn controlled by a photoelectric solar detector mechanism. The detector mechanism is so designed that it receives the early rays of light of the sun and signals the control system to commence tracking the sun. This operation continues until the sun sets, at which time a signal is sent to the control system to return the platform to its original position in the east whereby it is available for commencing the tracking of the sun the following day. The heat stored within the rock is transferred to a water system which includes pipes so that the heated water may be used to furnish the necessary heat to the particular structure being serviced.

DESCRIPTION OF A PREFERRED EMBODIMENT OF THE INVENTION

Figure 1:
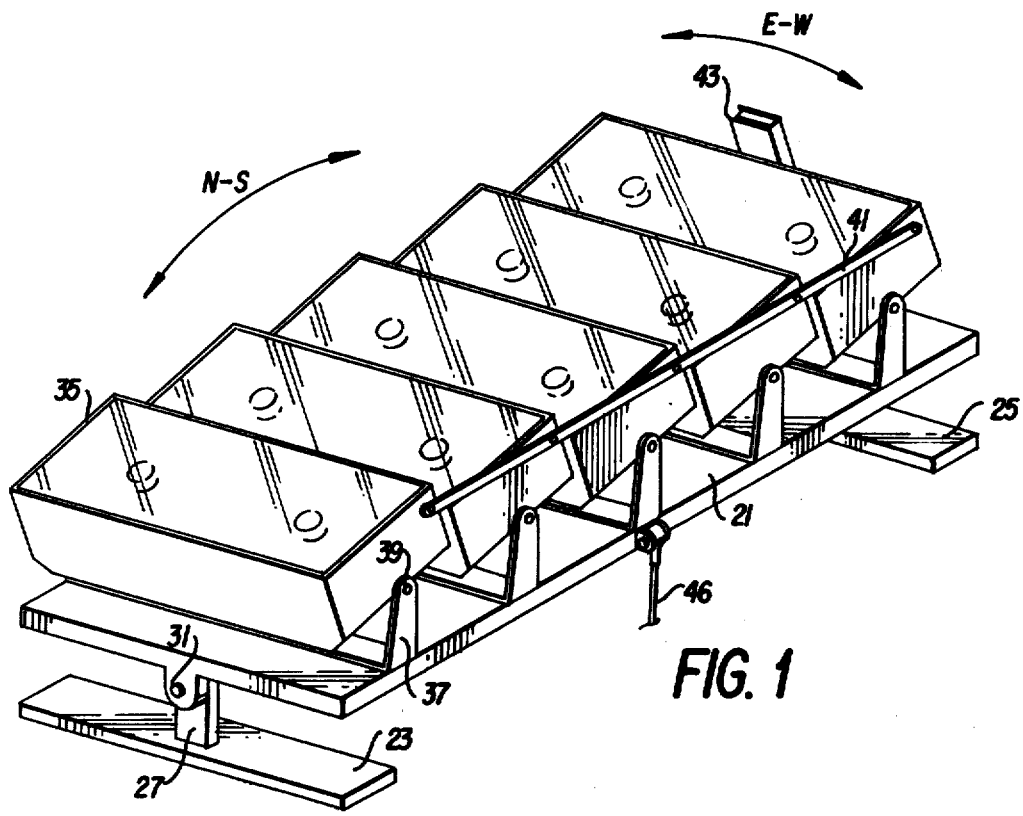
FIG. 1 is a perspective view of a preferred embodiment of the solar energy collecting array including a detector as used in the present invention.
Figure 2:
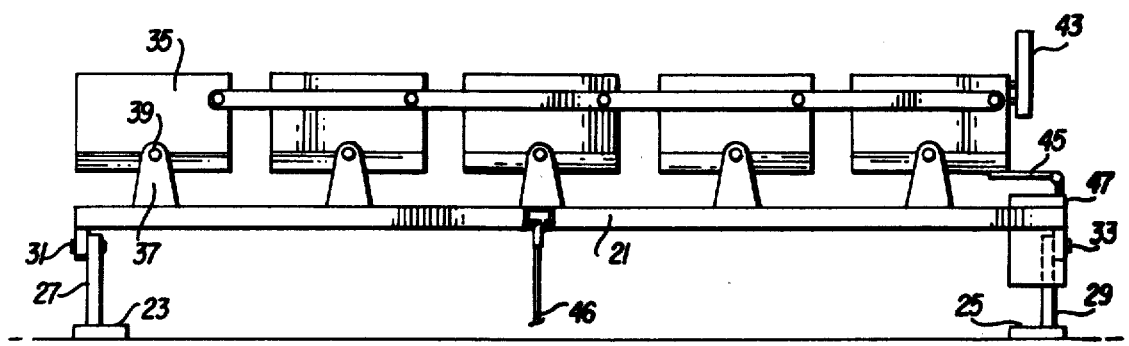
FIG. 2 is a side elevational view of the apparatus of FIG. 1.

Turning now to FIGS. 1 and 2 there is shown therein a base 21 which rests upon feet 23 and 25 through connecting legs 27 and 29 which are connected to the base 21 by means of pivot pins 31 and 33. Substantially identical solar heat collecting units 35 are mounted to the base 21 by means of a bracket 37 and pivot pins 39. A bar 41 connects each of the units 35 pivotally so that the movement of one unit will cause all of the remaining units to move in the same direction. It will be seen that, due to the pivot provisions at right angles to each other, this unit may be effectively moved in two separate directions. When it is located as desired, these two directions become the north-south direction and the east-west direction as indicated by the arrows in FIG. 1. In order to adjust the position of the units, an actuator, such as a motor 47 is secured to one of the units 35 by means of a rod which is pivotally movable by the motor so as to provide a N-S position desired. Such position is controlled by signals which are sent to the motor from the detector controller 43. The unit is provided with cables 46 and 48 which provide east-west movement as will be described in more detail as the description proceeds.

Figure 3:
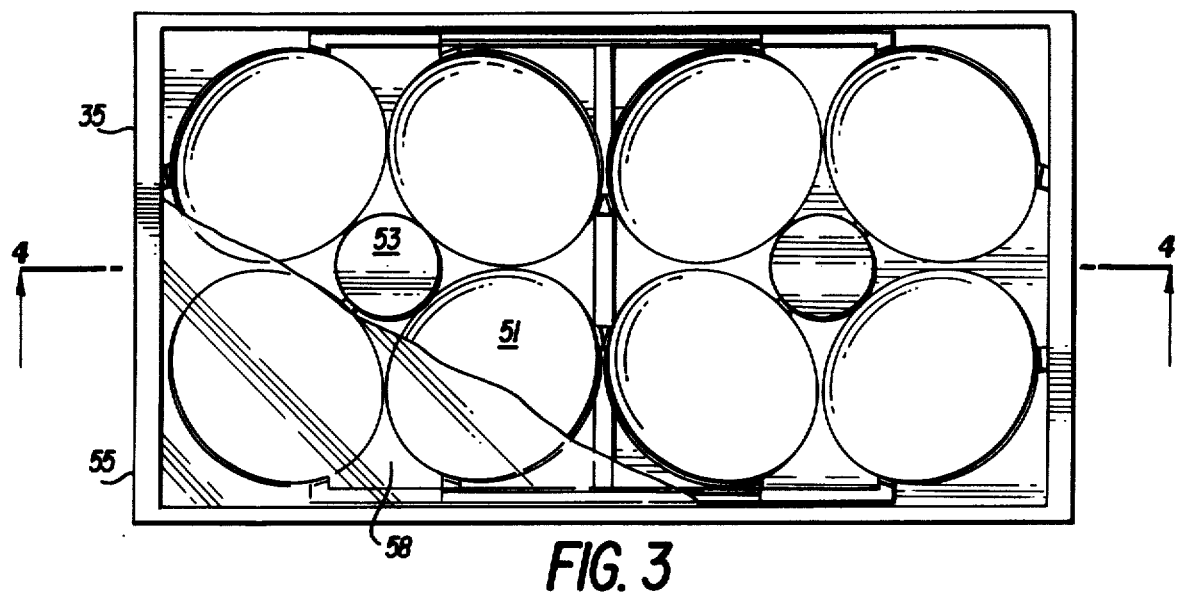
FIG. 3 is a plan view of one of the elements used for collecting energy as shown in FIG. 1.
Figure 4:
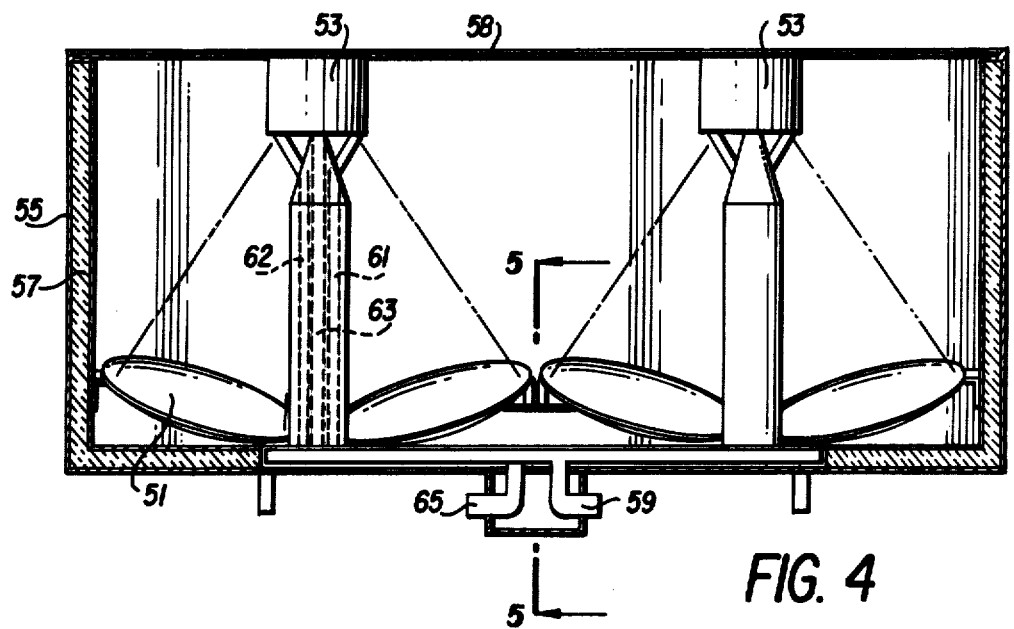
FIG. 4 is a sectional view taken through the lines 4—4 of FIG. 3.
Figure 5:
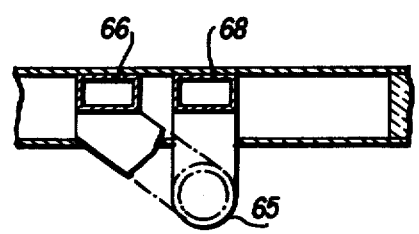
FIG. 5 is a sectional view taken through the lines 5—5 of FIG. 4.

FIGS. 3 through 5 are detailed showings of one of the units 35 of FIG. 1. Each of these units contain two substantially identical subunits, one of which will be described herein. This subunit includes a plurality of parabolic mirror reflectors 51 which are directed so as to axially concentrate the rays of the sun on the heat exchange unit 53. The entire unit is surrounded by a double walled enclosure 55 which includes insulation 57 between the walls. Additionally, it is preferable that the unit be covered by means of a transparent glass cover 58.

Air is supplied centrally through the input pipe 59, though feed pipes 61 and 62 and is circulated in the heat exchanger and through return pipe 63 to outlet pipe 65. This pipe goes to a heat storage system such as a lava rock storage container. The sectional view of FIG. 5 shows the input pipe 66 which leads to the feed pipes 61 and 62 and the return pipe 68 which is connected to pipe 63.

Figure 6:
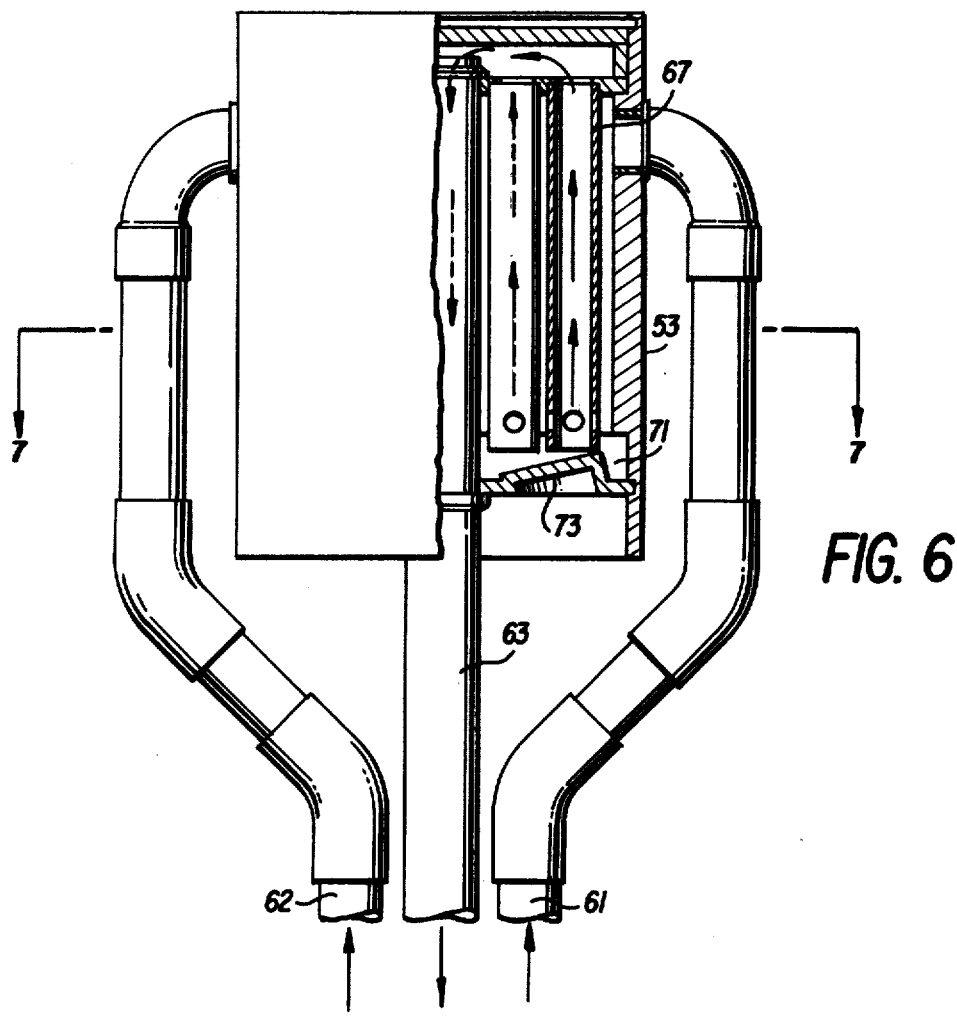
FIG. 6 is a partial sectional elevational view of a heat exchanger which may be used in the present invention.
Figure 7:
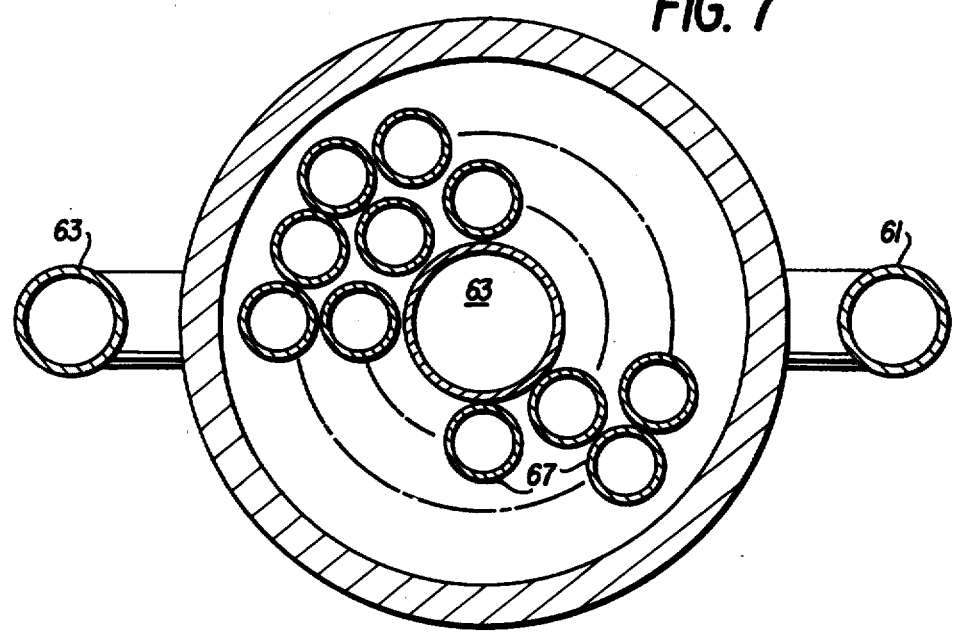
FIG. 7 is a sectional view taken through the lines 7—7 of FIG. 6.

FIGS. 6 and 7 show the details of the heat exchanger in greater detail. The heat exchanger 53 includes a compartment 71 to which air flows and which includes radiant heat absorbing plates 73 which receive the direct energy from the parabolic mirror arrangement as discussed above. The inlet air is supplied to both sides of the heat exchanger 53 by means of feed pipes 61 and 62 and circulates within the heat exchanger. This circulation occurs by means of providing inlet cool air which circulates downwardly about internal pipes 67 which extend upwardly above the compartment 71 so as to constantly circulate the air past the heat absorbing plates 73. The heated air exits through pipes 67 and conduit 63.

FIGS. 8 through 11 show in detail the sun tracking unit disclosed broadly in FIG. 1. Basically, the unit 43 includes an upper housing 81 and a lower housing 83. Within these housings, are enclosed the various electrical circuit controls which will be described in detail as the description proceeds. In order to control these various circuits, access to the sun's radiation is provided through various apertures and control units associated therewith. The housing is provided with a threaded connector so that it may be attached to one of the units as disclosed generally in FIG. 1.

On one side of the lower housing 83, there are provided apertures which are transparent and directly over photocells 87 and 89. Photocell 87 controls the actuation for returning the entire device to the east when the sun sets. Photocell 89 is used as a power monitor. A transparent cover is placed over a solar cell array 91 which is used for the east-west tracking control of the entire system. A shade flange 92 is located above the solar cell array 91 for purposes which will become apparent as the description proceeds.

Solar cell array 93, FIG. 9, is wired in parallel with the east-west array so as to provide retracking of the device if the sun disappears as a result of a cloudy day and the device does not receive the sun's rays. The control system will be described in more detail as the description proceeds.

Figure 13:
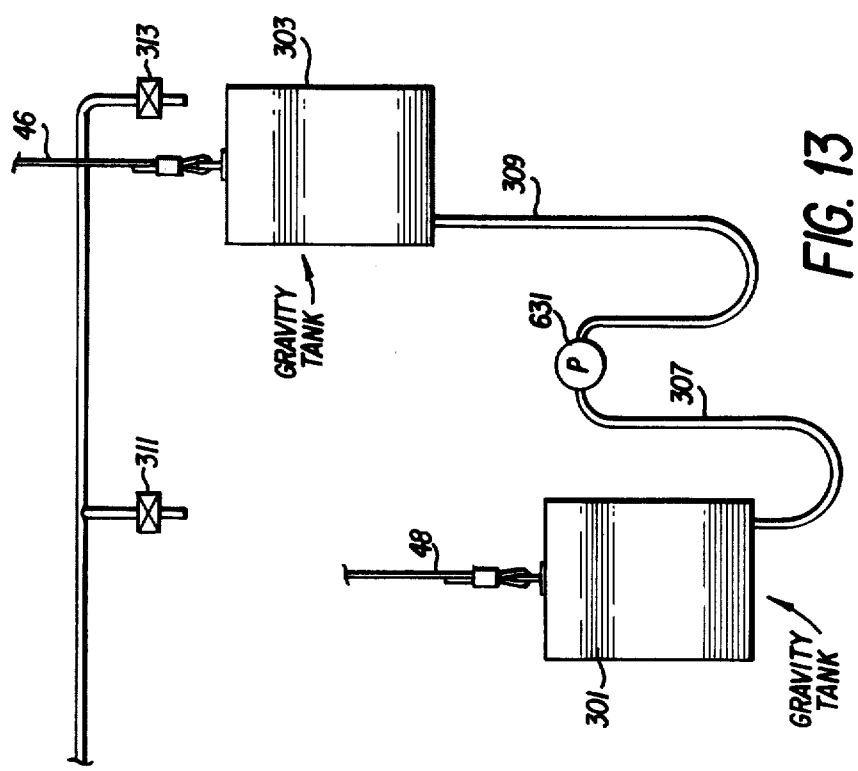
FIG. 13 is a schematic diagram of the east-west movement apparatus.

FIG. 13 is a schematic diagram illustrating the preferred means for moving the solar heating units in an east-west direction. One of the main purposes of the present invention is to provide an operating system using the least amount of electrical energy so that the system may operate for a relatively long period of time from storage batteries of reasonable size without being dependent upon a constant supply of utility power.

The proposed system shown in FIG. 13 may be maintained and built in any convenient position relative to the house itself or to any structure which is designed to hold the units as discussed above. Essentially, the system consists of two gravity tanks 301 and 303 which are supported by the cables 46 and 48 which are generally illustrated in FIG. 1. An amount of water sufficient to substantially fill one of the two gravity tanks is initially provided. A water pump 631 is connected between the two tanks by means of flexible tubing 307 and 309 and is controlled in accordance with a control system which will be described as the description proceeds. However, it will be obvious that the amount of pressure required to transfer the fluid such as water between the two tanks requires much less energy than if a motor were designed to drive the units in the east-west position. One of the tanks is referred to as west gravity tank while the other tank is referred to as the east gravity tank. When it is desired to move the device in the opposite direction, the fluid is transferred from tank 301 to tank 303 by means of the pump 631. This then produces the counterbalancing effect whereby tank 303 will be heavier than tank 301 and will thus exert the necessary force on cable 46 to move the units in the opposite direction. There are also shown valves 311 and 313 which are also controlled by the main control system so as to add water to either one of the tanks should evaporation occur. The operation of the entire system will become more evident relative to the discussion of the control system.

Figure 14:
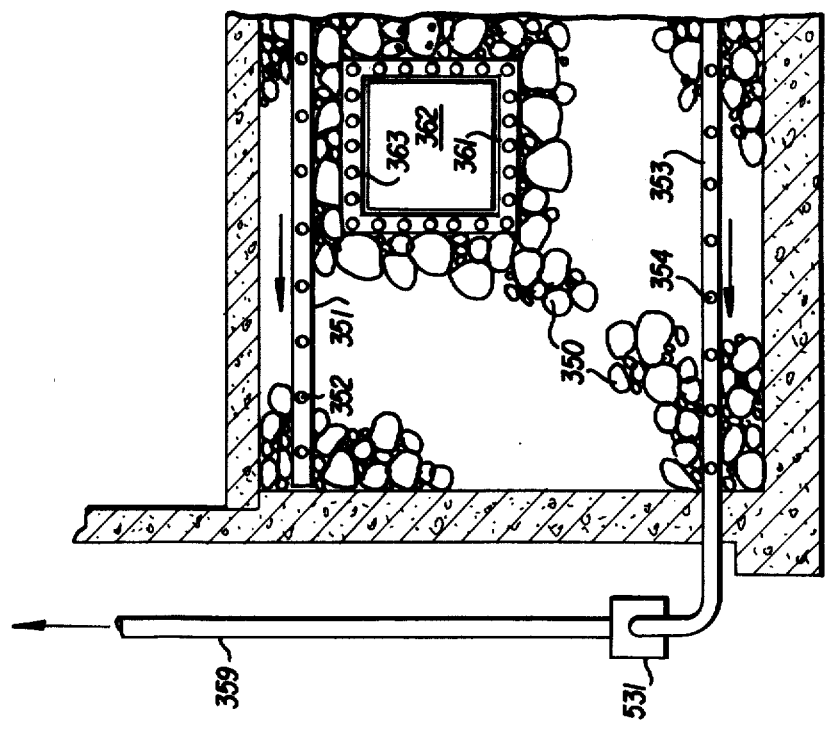
FIG. 14 is a schematic diagram of the heat storage and exchange apparatus.

FIG. 14 is a schematic illustration of the storage compartment and the basic method of accepting and storing heat from the devices as shown particularly in FIG. 6. The storage compartment can be located in any position, but is preferably underground where it is easily insulated. One such location would be under a garage floor whereby the equipment designed for use therewith could be located in an adjacent basement.

The conduit 351 receives the hot air from the hot air conduit 63 of FIG. 6. Conduit 351 has located therein a number of orifices 352.

The storage chamber has located therein a high heat storage capability material 350 such as lava rock. Although not specifically illustrated, it is preferable to have the rock gradient size decrease from the top of the chamber to the botton so as to extract the greatest amount of heat from the air input. At the bottom of the chamber is a further conduit 353 also having orifices 354 located therein. This conduit is connected to the blower motor 531 which is outside the chamber. Because of the normal physical aspects of heat, the lowest temperature air will be located at the bottom of the chamber and therefore will be drawn out through conduit 353 by blower motor 531.

Since the air circulation is basically a closed system, blower motor 531 advances the air from conduit 353 through conduit 359 to be returned back to cool air conduits 61 and 62 shown in FIG. 6.

It is to be understood that the present invention has for its primary purpose the concept of heating a very large storage chamber through the use of a continuous circulation of hot air derived from solar generation during spring, summer and fall seasons. This high temperature air is led through the rock formation, giving off its heat to the rocks, and is then sucked out of the collector pipes at the bottom of the chamber so as to be returned to the reflector. In order to use this heat, a fluid heat exchanger 362 is provided which, in the illustration shown, may be removably inserted in a cage structure 361 having a frame which includes a plurality of rods 363. Constant circulation of fluid through the heat exchanger picks up the heat from the surrounding rock and provides the necessary heat for the house. The use of the hot fluid may be provided in the house in a manner known for circulating fluid systems and is not shown in the particular drawings.

CONTROL SYSTEM

Figure 15A:
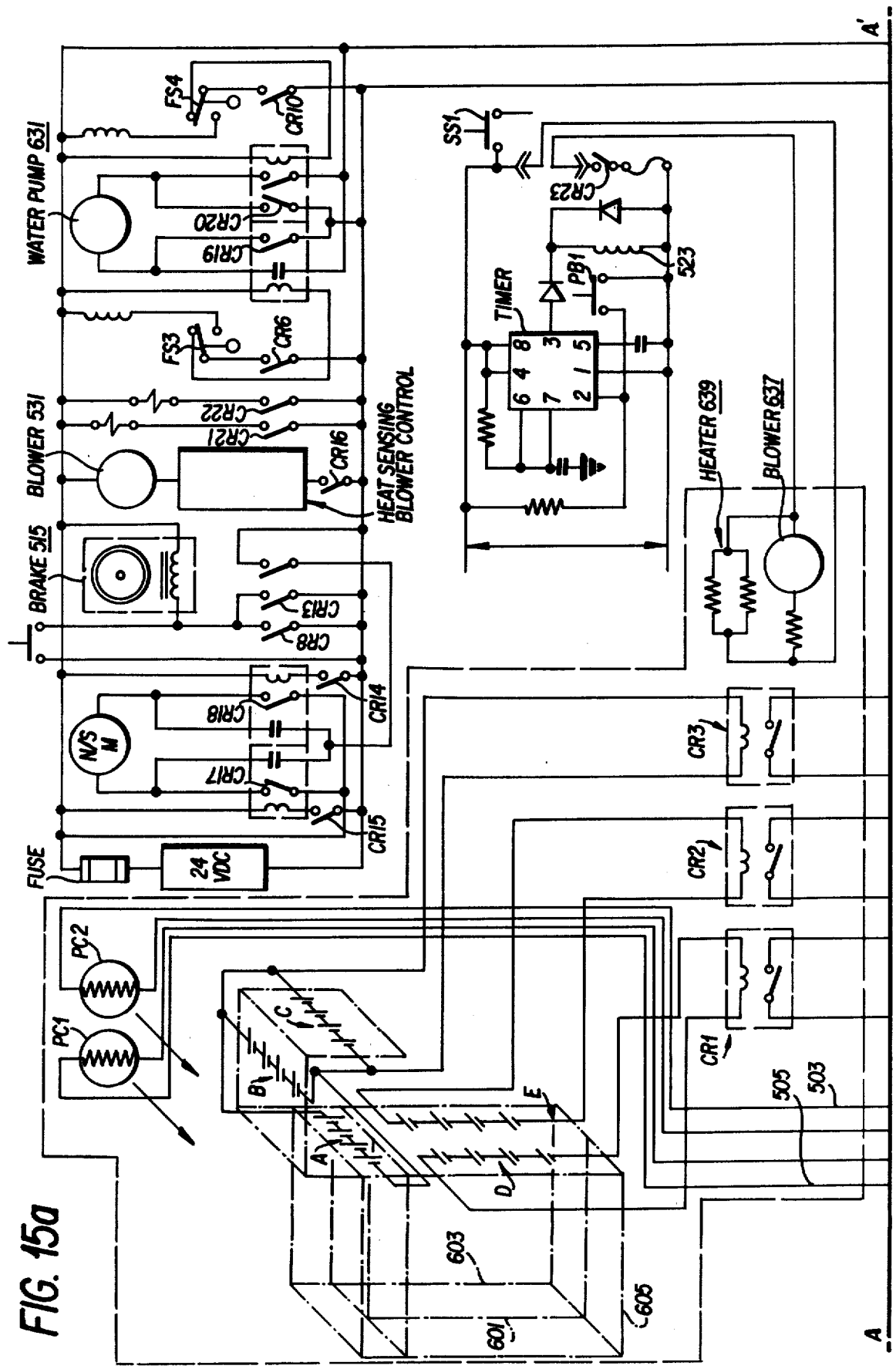
FIGS. 15A and 15B are schematic diagrams of the circuit control system for use with the controller of FIG. 8.
Figure 15B:
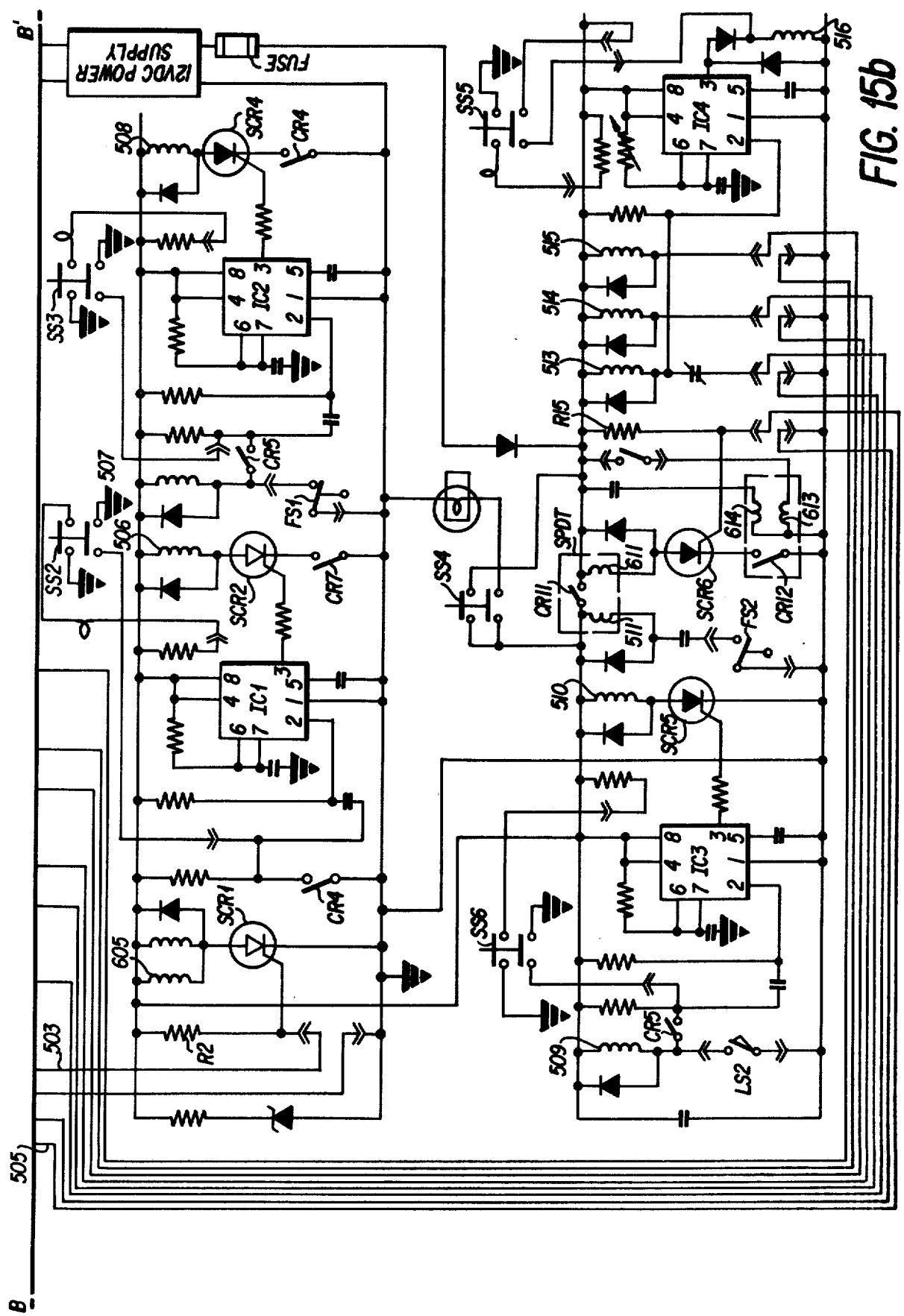

The control system which is to be discussed in detail relative to FIGS. 15a and 15b consists of a section relating to sun tracking which aligns an array of parabolic mirrors for the purpose of solar heat collecting. The system is so designed that the focal point of the parabolic mirrors will be aimed precisely at the sun at all times so as to collect the greatest amount of heat at the heat exchanger. A related part of the control circuit also controls a pressure blower which circulates the air in a closed circuit from the storage unit through the collectors and back to the storage unit. The speed of the blower is controlled by a further circuit via a thermal couple which acts as a sensor to provide a constant high temperature air output before the air enters the storage unit.

Another section of the control circuit relates to the return movement of the reflector after the sun sets so as to move the parabolic mirrors to the east so that they will be ready for operation when the sun rises the next day. This circuit also monitors the power use, with power consumption for operation of the facility occurring only if sufficient solar radiation is present, or during the return of the reflectors to the east. During all other times, the entire circuit is shut down with no substantial power consumption. The circuit resumes operation at any time there is sufficient sunshine available. Since the system consumes very little power, it is designed to run on two series connected batteries with about 800 to 1000 amp-hour capacity. The batteries may be charged by a 24 volt charger which may be automatically turned on or off as charging is needed or completed. Thus, operation of the facility will continue for some time even if utility power is interrupted due to weather conditions such as storms, ice buildups or powerline interruptions.

A further auxillary circuit is connected to the main circuit so as to protect the facility from storm damage. This particular circuit becomes activated when wind velocity exceeds approximately 50 miles an hour. It is designed so as to inhibit all functions of the tracking circuit by activating clamping devices which clamp down movable parts of the facility so as to render it secure and motionless. After the wind subsides to below a figure such as 50 miles per hour, the circuit will reverse and all of the clamping devices will be disconnected so that it may resume operation.

A further auxillary circuit is provided which includes special functions relative to winter operation. As an example, it is designed to prevent ice and show buildup on the tracking control head and the glass cover above the reflectors. This circuit is designed to activate itself when the outside temperature drops below 32° F. As long as the temperature remains above this value, the circuit remains inactive and is disconnected from the power supply.

Interaction of all of the above described circuits provides a fully automated operation of the facility in all weather conditions, in addition to providing control alignment of the reflectors so as to properly be directed to the sun from any position as long as sunshine is present, It will also cease tracking and remain in that position if the sun should disappear behind a cloud. When the sun reappears, it will track to realign the reflectors during the later part of the day. Additionally, if the sun should not appear during that same day, the unit will return to the east after nightfall. Should cloudiness prevail for several days, tracking will not occur and the return circuit will not be activated, since at least a 15° rise of the reflector array above the horizon is necessary to preset the return circuit.

Referring now specifically to FIGS. 15a and 15b, it is noted that, for clarity purposes, the power circuit shown in FIG. 15a has control relay switches which are activated by energizing various coils shown in FIG. 15b. In order to associate the coils with the control relays, the last two digits of the coil numbers correspond to the control relays which are designated with a CR plus a digit number.

In the following description, it is assumed that the reflector array has been properly returned to the east and is awaiting the sunrise and subsequent daylight of the day in question. The last function of the return circuit was to pump the water from the east gravity drive tank to the west gravity drive tank. When the water reaches the proper fill level, flood switch SF2 then closes its contact and energizes the unlatching coil 511 of CR11. Cr11 is a single pole double throw switch and the activation thereof, in turn, disconnects the return circuit from the power supply while the tracking circuit and the drive circuit remain connected to the power supply. Since a pure relay circuit is being used, there will be no power consumption in the non-tracking state.

When daybreak occurs, photocells PC1 and PC2 will decrease in resistance as the daylight level increases until they reach a very low value, thereby grounding the gates of SCR1 and SCR6 through leads 503 and 505.

Eventually, the sun rises over the horizon, and, as it continues to rise, its radiation intensifies. When the sun eventually is in line with the waiting reflector array, the entire system is ready to commence operation. The tracking head, which is attached to one of the eight reflector standard sections, is placed such that its solar cell arrays A, B, C, D and E are in exact parallel with the reflectors vertical axes. Since the sun is in line with the reflector array, as it continues to rise, the shadow thrown by the hood 507 on top of the tracking head will slowly retreat and will expose the solar cell array A to the sunlight. When substantially $\frac{2}{3}$ to $\frac{3}{4}$ of the solar cell array A is illuminated, the power generated will drive CR3 which, in the present description, requires approximately 1.5 volts at 12 ma to operate. Activation of CR3 drives relay coil 513 of relay CR13 which causes energization of the coil of the electromagnetic brake 515. This opens the brake and allows the west gravity drive tank to pull the reflector arrays forward. As this happens, the shadow from the hood 507 of the tracking head will again move the shadow over solar cell array A. When approximately $\frac{2}{3}$ of the array A is covered by the shadow, the power generated is too weak to sustain drive of relay coil CR3. Accordingly, relay CR13 drops out, and in turn, the electromechanical brake 515 again closes, thereby stopping the forward motion of the reflector array. As the shadow again recedes, caused by the rising sun, the action repeats itself.

Every time that CR3 causes energization of CR13, the trigger of IC4 is taken to ground. IC1 through 4 are all integrated circuits which provide a one shot control. In each of these integrated circuts, 2 is the trigger lead. In the present situation, IC4 works in a time delay off mode. After triggering, the output goes high, thereby energizing coil 516 of CR16. This turns on the pressure blower 531. The RC time of IC4 is set to be longer than the switching intervals of CR3. At constant sunshine, CR3 will have intervals of from 3 to 4 minutes. If the RC time of IC4 is set at 5 minutes, the output will remain high, since every 3 to 4 minutes the timer receives a new trigger pulse. This resets the time of IC4 for a new 5 minute period. Should tracking cease due to lack of sunshine, no new trigger pulse will follow the time and the timer goes low after the RC time has lapsed. This turns blower 531 off. This operation prevents colder air from entering the storage unit and the blower will turn on again as IC4 receives a new trigger pulse which indicates that the available solar heat is being received.

Solar arrays B and C provide a special function. As can be seen, the arrays B and C are connected in parallel with A. A, B and C are faced in a direction 90° from each other. Should clouds cut off sunshine at any time during the day, the tracking head ceases tracking and the reflector array remains in that position. Should sunshine return minutes or hours later that same day, array B or C will become illuminated and generate power to energize CR3. The reflector array will then turn continuously until array A is covered by a shadow, again stopping the motion of the reflectors. At this position, solar cell arrays B and C also are shaded, and, thus, removed from the control circuit and heat collecting commences again.

Solar cell arrays D and E perform north and south tracking functions. As will be evident, the shadow hood is designed in a way such that arrays D and E are divided by a wall 601. Light can only enter through small slot 603 and 605 at the left or the right at the top of the tracking unit. Should the reflector array become disaligned during sunlight in the north or south direction, either the E array to the south or the D array to the north will become illuminated due to the retreating shadow. Illumination of array E causes CR2 to switch on, which energized coil 514 of CR14 which again energizes power relay CR18 to cause the linear actuator to turn the reflector sections more to the south. As the tracking head moves with this motion, it stops the linear actuator as soon as its E array is covered by a shadow again since CR2 will drop out due to lack of power.

The same action occurs if tracking to the north is necessary. This occurs via CR1, coil 515, CR15 and CR17. It should be noted that north-south tracking is disabled while east to west tracking occurs by the actuation of CR13 in order to prevent excessive current surge from the supply.

Performance of the return to east circuit is as follows. As mentioned earlier, the gates SCR1 and SCR6 are grounded at daybreak by the low resistance of PC1 and PC2 and the return circuit is disconnected from the power supply by CR11. At sunset, as darkness increases, PC1 and PC2 will increase resistance at a comparable rate. Eventually, a point will be reached in which the resistance of PC1 will be equal to R15, and that of PC2 to R2. Since R15 is lower in value than R2 and R15, the SCR6 is still connected to the line of circuit, SCR6 will be triggered into conduction as soon as there is sufficient forward bias at the gate due to the increased resistance of PC1. SCR6 then drives the latching coil 611 of CR11 which in turn connects the return circuit to the power supply. At this point, it is noted that SCR6 can only conduct if its cathode lead is reconnected to ground. This will only occur if the reflector has risen more than 15° above the horizon and has triggered LS1 to energize latching coil 612 of CR12. If this has not occurred, the return circuit will remain disconnected from the supply since there is no need to return the reflector to the east when the rays has been less than 15°.

However, most of the time, the reflector array will rise above 15° and arrive at west by sunset. As has been stated, SCR6 has reconnected the circuit to the power supply at that point. Note also at this point, that IC1, IC2 and IC3 trigger leads are disconnected from ground to prevent false triggering during power up. This occurs since SCR1 is triggered later than SCR6 to the major of the IC configuration. At this point, SCR1 has not been fired, since R2 is of a higher value than R15. The resistance of PC2 further increases, a point will be reached where its resistance equals R2. Subsequently, the gate SCRI becomes forward biased and the SCR conducts, which in turn energizes the coil 604 of CR4 and coil 605 of CR5. CR4 triggers one shot IC1 and energizes the unlatching coil 614 of CR12 which drives SCR6 to off. The design purpose of SCR6 to to reconnect the return circuit to the live tracking circuit. CR5 connects the trigger lead of IC2 to FS1 and also triggers the lead of IC3 to LS2. One shot IC1 fires SCR2 which drives coil 506 to CR6 to energize power relay CR19. This turns on the reversible water pump 631 to fill the east gravity drive tank by using the water from the west drive gravity tank. Due to evaporation, one tank may become empty before the outer tank has reached the proper fill level. In such case, FS3 will energize CR19 and energize CR21 which is a water valve coil connected to tap water, which continues to fill the east gravity tank until float switch FS1 closes its contact, energizing coil 507 of CR7 which, in turn, cust off and CR6 drops out. At this point, the east gravity drive tank is completely filled.

FS1 additionally has triggered one shot IC2 which, in turn, has fired SCR4 to energize coil 508 so as to drive relay CR8. CR8 in turn causes electromechanical brake 515 to open which enables the east gravity tank, (which is now full) so as to pull the reflector array back to the east. It should be noted that the brake is attached to a speed increaser gear which gives a small brake (300 ma) greater holding power. Further, a centrifical break at the output shaft prevents excessive speed after the reflector array turns downward after it has passed the midpoint where natural gravity begins to enter into the moving power situation. When the reflector array reaches the east position, limit switch LS2 causes energization of coil 509 of CR9 which, in turn, cuts CR4 off. This deenergizes CR8, and the east-west electromechanical brake 515 again closes. It should be noted that CR9 relay connects FS2 to CR11 only after LS2 has triggered in order to prevent early energizing of the unlatching coil 511 of CR11 for any reason since this would disable the return circuit. LS2 also triggers one shot IC3 which, in turn, fires SCR5 which energizes coil 510 so as to drive CR10 to cause energizing of CR20 so as to turn on water pump 631 to refill the west gravity drive tank, using water from the east gravity drive tank. Additionally, due to evaporation, CR22 may be energized via FS4 in order to provide additional water which may be needed from tap water. When the water reaches the proper fill level, FS2 closes energizing coil 511 of CR11 thereby disconnecting the return circuit from power supply. This concludes the function of the return circuit. It will reactivate itself after the following sunrise, providing that the reflector has moved at least 15° above the horizon.

It is noted that switches SS2 through SS6 and TB2 are provided in order to permit manual operation at any time it is so desired.

Switch SS1 connects a circuit to the supply which might be needed after many years of service to the tracking head. Although the tracking head is permanently sealed and provisions are made to prevent a break in the seal in extreme weather conditions, moisture might enter the head and condense the glass cover above the solar cell arrays particularly in cold weather. Since this could impede the tracking performance, depressing of TB1 activates the timer IC whose output goes high and remains high for a set RC time constant. This energizes coil 523 so as to drive CR23 which turns on blower motor 637 and heater coil 639 to dry up the channel between the solar cells and the glass covers.

AS will now be apparent, the present invention provides an integrated solar heat system which is available for substantially year around use. The unique heat storage medium provides excellent flexibility so as to accommodate for changing weather conditions while requiring a minimum amount of electrical input for operating the system.

The above description and drawings are illustrative only since equivalent components could be substituted within the system without departing from the invention which is to be limited only by the scope of the following claims.

We claim:

1. A solar energy heating system for supplying heat to a building structure comprising
   a plurality of parabolic mirror reflectors mounted on a movable base;
   first means mounted on said base in a position so as to intercept and absorb the reflected solar energy from said mirror reflectors;
   enclosure means for containing particulate heat absorbing material;
   means for circulating gas in a closed system through said first means so as to be heated thereby;
   means for passing said heated gas downwardly through said particulate material so as to transfer heat to said material;
   means for returning said gas to said first named means after it has passed downwardly through said material;
   means mounted on said base for detecting the position of the sun;
   means responsive to the output of said detector means for moving said base in a north-south and east-west direction so as to direct said reflectors towards the sun;
   said means for moving said base in an east-west direction being a gravity system comprising
     a first fluid container supported from the east side of said base;
     a second fluid container supported from the west side of said base;
     a fluid supply sufficient for filling one of said containers;
     a fluid pump interconnected between said container by means of a flexible conduit for selectively transferring all of said fluid supply to one of said containers, said pump being controlled in response to the output of said detector means; and
     an electromechanical brake responsive to said detector means for controlling the movement of said fluid containers;
   heat exchanger means within said particulate material for collecting the heat absorbed by said material; and
   means for circulating fluid in a closed system between said heat exchanger means and said building structure.

2. The heating system of claim 1 further comprising means responsive to said detector means for automatically moving said base so that said reflectors substantially face the eastern horizon after the sun has set.

3. The heating system of claim 1 wherein said detector means comprises a plurality of photoelectric solar detectors.

4. The heating system of claim 1 wherein said first means comprises
   at least one heat collecting unit, said unit comprising
     a compartment;
     radiant heat absorbing plates in said compartments which receive said solar energy from said reflectors;
     an air input conduit coupled to said compartment for supplying said returned gas to said heat absorbing plates;
     an exit conduit; and
     internal pipes within said compartment for directing the heated gas to said exit conduit.

5. The heating system of claim 1 further comprising heat sensing means within said means for circulating said gas for initiating and terminating said circulation in response to a predetermined temperature of said gas.

6. The heating system of claim 1 wherein said means for moving said base in a north-south direction comprises an electric motor.

7. The solar energy system of claim 1 further comprising
   a double walled enclosure surrounding the sides and bottom of said hyberbolic mirror reflectors; and
   a transparent cover over the top.

8. The solar energy system of claim 1 further comprising
   means for retaining all moveable parts of said system in a motionless mode when wind velocity exceeds a predetermined amount.

9. The solar energy system of claim 1 further comprising
   means for terminating movement of said system and circulation of said gas during periods when clouds block out the sunlight.

* * * * *